(12) United States Patent
Coffin, III

(10) Patent No.: US 7,783,247 B2
(45) Date of Patent: *Aug. 24, 2010

(54) SATELLITE RECEIVING SYSTEM WITH TRANSMODULATING OUTDOOR UNIT

(75) Inventor: Louis F. Coffin, III, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 666 days.

This patent is subject to a terminal disclaimer.

(21) Appl. No.: 11/275,855

(22) Filed: Jan. 31, 2006

(65) Prior Publication Data

US 2006/0128300 A1 Jun. 15, 2006

Related U.S. Application Data

(63) Continuation of application No. 10/154,615, filed on May 22, 2002, now Pat. No. 7,010,265.

(51) Int. Cl.
*H04H 20/74* (2008.01)

(52) U.S. Cl. ............... 455/3.02; 455/12.1; 455/427; 455/428

(58) Field of Classification Search ........... 455/3.02; 375/316
See application file for complete search history.

(56) References Cited

U.S. PATENT DOCUMENTS

| | | | | |
|---|---|---|---|---|
| 5,455,960 A | * | 10/1995 | Pelchat et al. | 455/12.1 |
| 5,488,653 A | * | 1/1996 | Dimolitsas et al. | 379/100.17 |
| 5,594,780 A | * | 1/1997 | Wiedeman et al. | 455/430 |
| 5,748,742 A | * | 5/1998 | Tisdale et al. | 380/249 |
| 5,875,182 A | * | 2/1999 | Hatzipapafotiou | 370/321 |
| 5,915,020 A | * | 6/1999 | Tilford et al. | 455/3.02 |
| 6,430,233 B1 | * | 8/2002 | Dillon et al. | 375/316 |
| 6,445,907 B1 | * | 9/2002 | Middeke et al. | 455/226.1 |
| 6,600,730 B1 | * | 7/2003 | Davis et al. | 370/343 |
| 6,622,307 B1 | * | 9/2003 | Ho | 725/120 |
| 6,650,869 B2 | * | 11/2003 | Kelly et al. | 455/13.2 |
| 6,725,017 B2 | * | 4/2004 | Blount et al. | 455/67.13 |
| 6,771,930 B2 | * | 8/2004 | Buer | 455/13.4 |
| 6,856,787 B2 | * | 2/2005 | Karabinis | 455/12.1 |
| 7,010,265 B2 | * | 3/2006 | Coffin, III | 455/3.02 |
| 2001/0012775 A1 | * | 8/2001 | Modzelesky et al. | 455/427 |

* cited by examiner

*Primary Examiner*—Nay A Maung
*Assistant Examiner*—Richard Chan
(74) *Attorney, Agent, or Firm*—Lee & Hayes, PLLC

(57) ABSTRACT

A home satellite receiving system employs a transmodulating outdoor unit (ODU) that tunes to multiple signals, demodulates those signals into streams of data packets, and filters the streams of data packets to select data packets pertaining to viewer-specified programs. The ODU then constructs an integrated bitstream from the selected data packets and modulates that bitstream for transmission to an indoor IRD. This allows transfer of multiple programs from different satellite sources to the indoor IRD over a single coaxial cable. The indoor IRD reconstructs the packet stream timing for the viewer-specified programs from the integrated bitstream.

15 Claims, 3 Drawing Sheets

SATELLITE RECEIVING SYSTEM WITH TRANSMODULATING OUTDOOR UNIT

CROSS-REFERENCE TO RELATED APPLICATIONS

This application is a continuation of pending U.S. application Ser. No. 10/154,615, which was filed on 22 May 2002, and was entitled "Satellite Receiving System with Transmodulating Outdoor Unit". The applicant claims the full benefit of the filing date of this parent application to the fullest extent permitted under 35 U.S.C. §119. All subject matter disclosed in this parent application is incorporated herein by this reference as if set forth verbatim herein.

TECHNICAL FIELD

This invention relates to architectures for home digital satellite receiving systems.

BACKGROUND

Home satellite receiving systems have grown in popularity over the years. People living in rural areas were early adopters, as these people were often underserved by cable and regional broadcast networks. They mounted large dish receivers in their fields or backyards to enable satellite reception of a broader selection of programming. As transmission technology improved, the dish size decreased, paving the way for wider adoption in residential and urban areas. The dish functions as a passive reflector to focus signals received from the satellite onto a low noise block (LNB) element. Signals are transmitted in the microwave range of 11.7 to 12.2 GHz, and once received, are translated to multiple transponder frequencies ranging from 950 to 1450 GHz.

Early home satellite receiving systems were equipped with one tuner to tune to one transponder. The tuner resided in an indoor unit, often referred to as the integrated receiver/decoder (IRD). The IRD allowed the viewer to select a satellite polarity and a transponder and receive one or more programs carried by the transponder. To choose a different program not in that transponder, the IRD-based tuner may need to select a new polarity so that it could tune to the correct transponder for the desired program.

With the growth in popularity of personal video recorders (e.g., digital video recorders, such as UltimateTV®-brand system from Microsoft Corporation), some satellite receiving systems are now equipped with multiple tuners. This allows the viewer to watch one program while recording another. The tuners are capable of tuning to different transponders independently of each other, thereby enabling reception of multiple signals. The signals are conducted from the outdoor receiving dish to the indoor IRD via multiple cables, one for each tuner. As an example, the UltimateTV®-brand system from Microsoft Corporation is equipped with two tuners, and two coaxial cables are employed to interconnect the satellite receiver with the system.

It would be an improvement, however, if home satellite receiving systems could be equipped with multiple tuners, yet not require such cumbersome cabling.

SUMMARY

A home satellite receiving system employs a transmodulating outdoor unit (ODU) that aggregates the multiple signals received by a satellite receiver into an integrated bitstream, which can then be transmitted over a single coaxial cable to the indoor IRD. In the described implementation, the ODU has multiple tuners to tune to multiple satellite signals. The ODU demodulates those signals into respective streams of data packets and selects subsets of the data packets that belong to viewer-specified programs, while filtering out unwanted data packets. The ODU then constructs an integrated bitstream from the selected data packets and modulates that bitstream for transmission to the indoor IRD. This facilitates transfer of multiple programs from different satellite sources over a single coaxial cable to the indoor IRD. The indoor IRD reconstructs the packet stream timing for the viewer-specified programs from the integrated bitstream.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

A home satellite receiving system is described in connection with the is attached drawing figures. The same numbers are used throughout the disclosure and figures to reference like components and features. The first digit in a reference number indicates the drawing figure in which that reference number is introduced.

DETAILED DESCRIPTION

The following discussion is directed to a home satellite receiving system equipped with an outdoor unit (ODU) that is capable of concurrently receiving multiple signals from different satellite sources and/or polarities of one satellite and producing a single data stream that can be transmitted to an indoor integrated receiver/decoder (IRD) over a single coaxial cable. The indoor IRD demodulates the data stream and routes the data to other devices for display and/or storage. By equipping the home satellite receiving system with the transmodulating ODU, the indoor IRD can be manufactured more simply, thereby reducing the costs of IRDs.

The home satellite receiving system is described in the context of receiving digital video content. Representative video content includes such things as movies, television programs, commercials, live events, and so on. While the system is described as receiving video content, it can be used to record other forms of streaming content, such as audio.

Exemplary Environment

Figure 1:
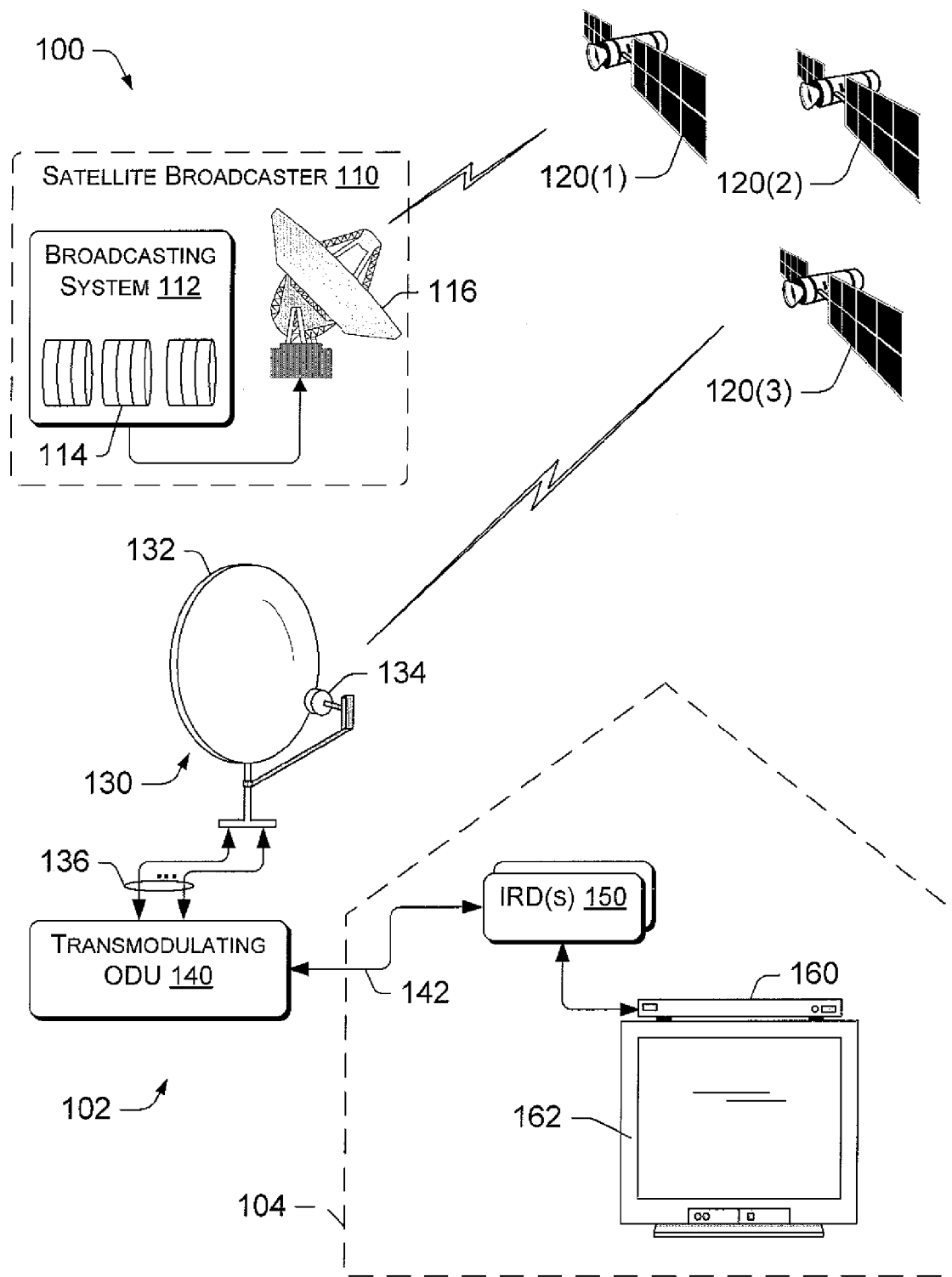
FIG. 1 illustrates a home satellite receiving system in which a transmodulating outdoor unit (ODU) may be implemented.

FIG. 1 shows an exemplary environment 100 in which a home satellite receiving system 102 can be implemented. Satellite receiving system 102 is illustrated as residing at a viewer's home 104. A satellite broadcaster 110 has a broadcasting system 112 that packages the video content into digital packets for transmission over a satellite network. The video content originates from a live feed received at the broadcaster 110, or from stored content kept on storage disks 114. An uplink transmitter 116 transmits the stream of packets as a modulated signal to one or more orbiting satellites, represented by satellites 120(1), 120(2), and 120(3). The target satellite retransmits the modulated signal to the home satellite receiving system 102.

The home satellite receiving system 102 has a satellite receiver 130 that is mounted outside of the viewer's home 104 to receive the signals from the multiple satellites 120(1)-120(3). Each satellite transmits signals on two different polarities: right hand polarity and left hand polarity. In a three satellite architecture, the home satellite receiving system 102 could be called upon to receive up to six different signals.

The satellite receiver 130 has a passive reflector dish 132 that reflects satellite signals received from the satellites 120(1)-120(3) onto a low noise block (LNB) element 134. The satellite receiver 130 passes the multiple signals over corresponding conductors or cables 136 to an outdoor unit (ODU) 140. As its name implies, the outdoor unit 140 is mounted externally of the viewer's home 104 and proximal to the receiver 130 so that the cables 136 are relatively short in length. The ODU 140 may be located, for example, on the back of the dish 132 or mounted at or near its supporting base.

The ODU 140 tunes to multiple signals, demodulates the signals to recover the data packets, and filters the data packets based on their program identifier (PID). The ODU 140 then statistically multiplexes multiple packet streams for multiple programs into a single data stream and modulates the single data stream. Because the ODU 140 is capable of demodulating multiple signals, producing a single data stream, and then remodulating that data stream for transmission to the IRD, the ODU is referred to as a "transmodulating" device.

The transmodulating ODU 140 transmits the modulated data stream over a single cable 142 to one or more IRDs 150 inside of the viewer's home 104. The IRDs 150 demodulates the stream of packets and routes the packets to a set-top box 160 (or other decoder unit) directly, or via a home network (not shown), for display on a television 162. Multiple IRDs may be used in a viewer's home to facilitate satellite reception control from different venues and televisions in the home.

The viewer enters commands to control satellite reception via the set-top box 160 using, for example, a remote control handset. The set-top box 160 passes these commands to the IRD 150, which transmits them to the transmodulating ODU 140 over the cable 142, or some other conductor (not shown). Based on the viewer command, the ODU 140 tunes to the appropriate transponder frequency of a band polarity from a designated satellite, and filters the demodulated packets to obtain the packets for the viewer-designated programs.

Exemplary ODU

Figure 2:
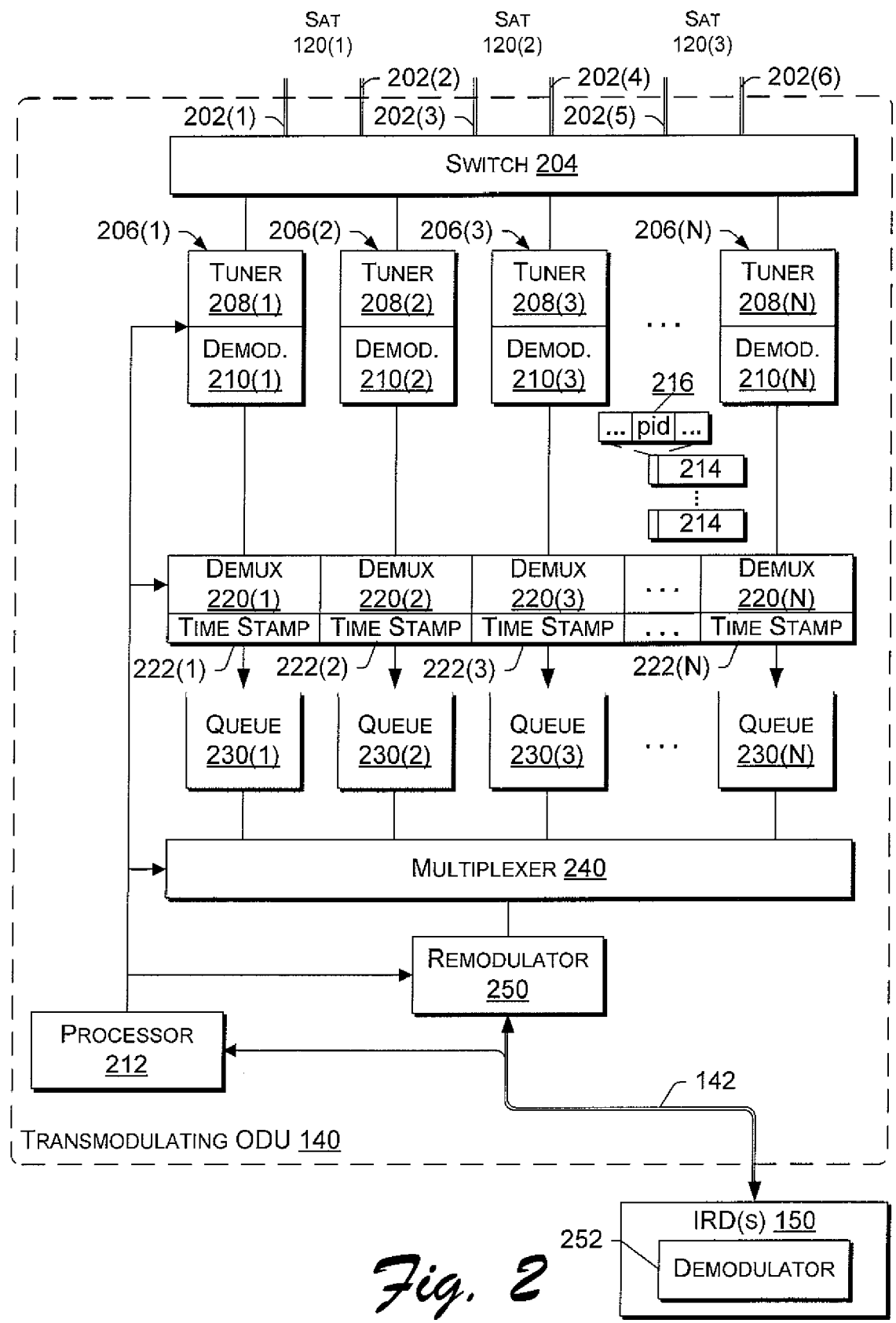
FIG. 2 is a block diagram of the transmodulating ODU.

FIG. 2 shows an exemplary implementation of the transmodulating ODU 140. It has multiple inputs to receive multiple signals from the satellites. In the illustrated implementation, there are six inputs 202(1), 202(2), ..., 202(6) to receive two polarities from each of the three satellites 120(1)-120(3). The inputs are coupled to a switch 204, which connects the inputs to various x tuner/demodulator pairs 206(1), 206(2), ..., 206(N).

Each tuner/demodulator pair has a tuner 208(1), 208(2), ..., 208(N) and an associated demodulator 210(1), 210(2), ..., 210(N). The tuner 208 tunes to individual transponder frequencies as directed by viewer-entered commands. The viewer-entered commands are sent to the ODU 140 from the TIRD 150, and routed to a processor 212, which directs the tuners 208(1)-208(N) to tune to the desired transponder frequencies.

As the tuned signal is received, the associated demodulator 210(1)-210(N) demodulates the signal to recover a bitstream. One exemplary demodulated bitstream contains data coded at 30 Mbits/second. The bitstream consists of digital data packets, as represented by packets 214. Each packet contains a header, content (video, audio, etc. in compressed or non-compressed form), redundancy, and so on. Each packet header includes the program identifier (PID) 216 that associates the individual packets with a program (e.g., television show, on-demand movie, newscast, sports event, etc.).

The number of signals that the ODU 140 can concurrently receive depends on the number of tuner/demodulator pairs 206. There is one tuner/demodulator pair 206 for each signal. For instance, to receive six different signals simultaneously from the three satellites 120(1)-120(3), the ODU 140 is equipped with six tuner/demodulator pairs 206 (i.e., N=6). The demodulated streams of packets are passed from the tuner/demodulator pairs 208(1)-208(N) to associated demultiplexers 220(1)-220(N) for selection of one or more individual programs. There is one demultiplexer 220 for each tuner/demodulator pair 206. Each demodulated packet stream typically contains packets for multiple programs. For each stream, the associated demultiplexer 208 selects packets for requested programs based on the PID 216 found in the header. The processor 212 instructs the demultiplexers 220 of the desired PID 216 in response to a program selection made by the viewer. This program selection is conveyed to the processor 212 from the IRD 150. By selecting the packets with the appropriate PID, the demultiplexers 208 operate as a filter to filter out unwanted data packets having PIDs associated with programs that are not selected by the viewer. This reduces the bitstream density, thereby improving bandwidth downstream on the single cable 142. For example, the demultiplexing process might reduce the bitstream from, say, 30 Mbits/second to 5 Mbits/second.

The selected packets are time stamped with a local time by time stamping units 222(1)-222(N). The localized time stamp will be used to reconstruct the packet stream timing for various programs at the IRD) 150, as described below. Until this point in the transmodulating process, the packets in individual streams are handled with constant broadcast delay. Once they are demultiplexed and time stamped, however, the packets are handled at variable rates until reconstructed at the indoor IRD 150. The variable delay between packets allows the multiple 8 streams to be flexibly integrated into a common stream for transmission.

The selected packets are stored in respective queues 230(1), 230(2), ..., 230(N). There is one queue 230 for each tuner/demodulator pair 206. Through this point in the processing, the ODU 140 has maintained the data packets in their respective streams. That is, queue 230(1) holds the filtered packets received via tuner 208(1) and demodulated by demodulator 210(1). Similarly, queue 230(2) holds the filtered packets received via tuner 208(2) and demodulated by demodulator 210(2), and so on. The packets from different streams are passed into their respective queues at different rates. The queues 230 temporarily store the packets from different streams for subsequent construction of an integrated bitstream having packets from multiple programs.

The queued packets from queues 230(1)-230(N) are assembled by a multiplexer 240 into a single data stream. The multiplexer 240 effectively aggregates data packets from different programs into a common stream. The multiplexer 240 chooses the packets from the various queues for assembly in the data stream according to any one of many different selection criteria For instance, the multiplexer 240 might choose packets from the various queues according to the local time stamp on the packets. Alternatively, the multiplexer may iteratively take one packet at a time from each queue in a rotational cycle. In still another implementation, the ODU may implement a FIFO (first in first out) scheme. Another possibility is for the ODU to prioritize requests and select packets in accordance with the priority assigned to the requested program. Packets might also be selected based on queue depth by taking packets from the queue with the most packets, or selecting packets when individual queues reach a predetermined number of packets.

The demultiplexer 240 outputs the single bitstream to a remodulator 250, which modulates the bitstream for transmission to the IRD 150. The remodulator 250 can utilize a conventional modulation technique, such as QAM, COFDM, QPSK, 8PSK, and the like. The single data stream can be modulated at the same or different frequency as the satellite signal originally received by the ODU. The modulated bitstream is passed over the coaxial cable 142 to one or more IRDs 150. In this manner, the IRDs 150 receive a modulated bitstream as expected from the satellite receiver. However, this modulated bitstream contains packets from multiple satellite signals, as opposed to just one.

The IRD 150 has a demodulator 252 to demodulate the bitstream received from ODU 140. The IRD 150 then reconstructs the timing of the packets for various programs using the local time stamps applied by the ODU. This reconstruction restores the intended delay between packets in a common program stream. The IRD 150 is also coupled to supply instructions to the ODU, either via the cable 142 or another connection (wire-based or wireless). The instructions pertain to such operations as tuning and program selection. The instructions are handled by the processor 212. Additionally, the IRD can provide feedback to improve or modify transmission of the modulated signal over the cable 142. The processor 212 receives the feedback and makes adjustments to the remodulator 250.

One beneficial feature of the ODU 140 is the ability to select programs individually, rather than being constrained to selecting transponder polarities. By demodulating the signal and selecting packets based on program identifiers (PIDs), the ODU is able to filter unwanted packets and thereby increase the bandwidth efficiency on the coaxial cable 142.

Another advantageous feature of the system is that the complex demodulation of the satellite signals is handled at the ODU 140, rather than the IRD) 150. The ODU can then implement a different, less complex demodulation scheme for the local modulation performed by the remodulator 250. For instance, the remodulator 250 may use a simple modulation scheme, such as QSPK, to transmit the data to the IRD. The IRD can thus be designed with less complex demodulation components, resulting in a less expensive device. This allows consumers to purchase multiple IRDs for their home entertainment architecture, all of which can be supported by a single ODU 140.

Another advantage of the system is that it affords a controlled signal environment, which is not susceptible to interference. A weak satellite signal can be decoded close to the initial receiver, thereby improving recovery of the signal. This permits use of simpler and less sophisticated ODU tuning and demodulator components. Additionally, adjusting for any changes in the modulation scheme used by the satellite involves merely replacing the ODU, rather than the in-home IRD(s).

Satellite Reception and Transmodulation

Figure 3:
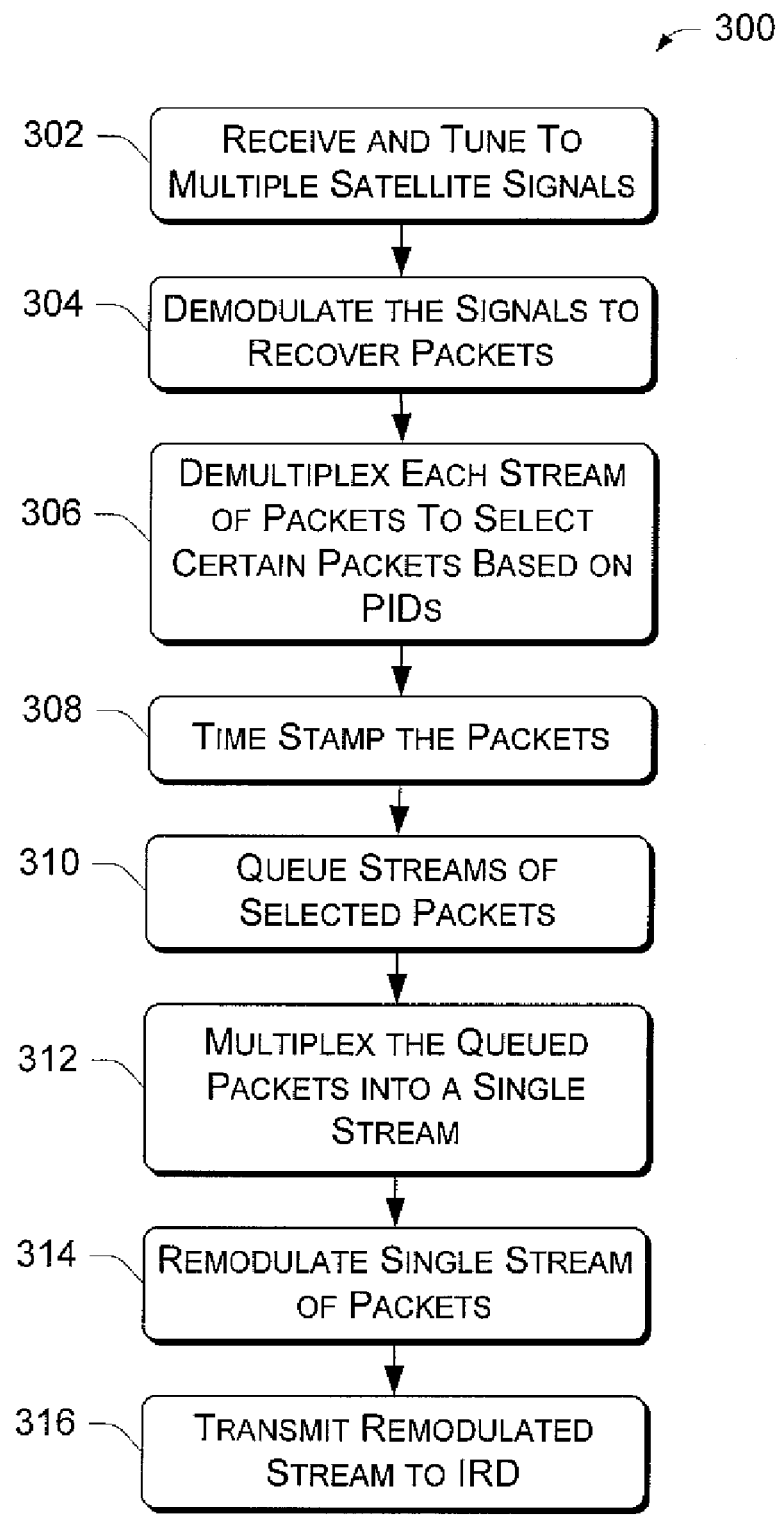
FIG. 3 is a flow diagram of an exemplary process for receiving signals from multiple satellites and producing a single data stream for input to an in-home IRD.

FIG. 3 shows an exemplary process 300 for operating the home satellite receiving system to receive signals from multiple satellites and produce a single data stream for input to an in-home IRD. The process will be described with reference to the implementation of the transmodulating ODU 140 described in FIGS. 1 and 2. The process 300 is implemented by a combination of software, firmware, and hardware. In the case of software and firmware, process 300 represents a set of operations that may be implemented as computer-executable instructions that can be executed by one or more processors.

At block 302, the satellite receiving system 102 receives one or more satellite signals from one or more satellites 120. These signals may be from different polarities of the same satellite or from different satellites. The multiple tuners 208 in the ODU 140 tune to particular transponder frequencies in the one or more signals.

At block 304, demodulators 210 demodulate the signals received at the transponder frequencies. The demodulation results in a stream of packets for each received signal. At block 306, associated demultiplexers 220 demultiplex each stream of packets to select certain packets, and filter others, based on the program identifier (PID) contained in the packets. The desired PIDs are conveyed to the ODU 140 from the IRD 150 based upon user input. The selected packets are time stamped with a local timestamp (block 308).

At block 310, the streams of time stamped packets are stored temporarily in respective queues 230. At block 312, the multiplexer 240 multiplexes the queued packets from the different streams into a single data stream. The remodulator 250 then modulates the single data stream (block 314). The data stream may be modulated using a different modulation scheme and at a different modulation frequency than that of the original signal received from the satellite. At block 316, the ODU transmits the modulated single data stream over the cable 142 to the IRD 150.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A home satellite receiving system, comprising:
  a receiver to receive multiple satellite signals from multiple satellites; and
  a transmodulating outdoor unit, proximally connected to the receiver, to;
    tune, by multiple tuners, to the satellite signals;
    demodulate, by a demodulator associated with a corresponding tuner, one of the satellite signals into a corresponding bitstream composed of multiple multimedia programs, each bitstream comprising data packets containing a header that includes a program identifier that associates individual data packets with a particular multimedia program, wherein the transmodulating outdoor unit includes one tuner/demodulator pair for each satellite signal received;
    select, by a demultiplexer and for each bitstream, data packets associated with multimedia programs requested by a viewer based on the program identifier found in the header and form a single bitstream containing the selected data packets from the multiple streams but excluding data packets associated with multimedia programs not requested by the viewer; and
    remodulate the single bitstream for local transmission to one or more indoor integrated receiver/decoders over a single cable to an indoor device for display, the modulated single bitstream containing data packets from the multiple satellite signals.

2. The home satellite receiving system as recited in claim 1, wherein the transmodulating outdoor unit is further to demodulate the satellite signals according to a first modulation technique, and to remodulate the single bitstream according to a second modulation technique that is different than the first modulation technique.

3. The home satellite receiving system as recited in claim 1, wherein the transmodulating outdoor unit is further to handle different ones of the data packets at variable delays relative to one another.

4. The home satellite receiving system as recited in claim 1, wherein the transmodulating outdoor unit is further to handle different ones of the data packets at variable rates relative to one another.

5. In a satellite receiving system, a transmodulating outdoor unit, comprising:
   multiple tuners to tune to different satellite signals from multiple satellites;
   multiple demodulators, with a respective demodulator being associated with a corresponding tuner, to demodulate an associated signal received by the corresponding tuner into a stream of data packets, the stream of data packets containing a header that includes a program identifier that associates individual data packets with a particular multimedia program, wherein each different satellite signal being tuned to corresponds to a tuner and corresponding demodulator;
   multiple demultiplexers, with a respective demultiplexer being associated with a corresponding demodulator, to select a subset of data packets from an associated stream of data packets output by the corresponding demodulator, the selected subset of data packets being associated with multimedia programs requested by a viewer and being selected based on the program identifier found in the header, wherein the subset of data packets does not include data packets associated with multimedia programs not requested by the viewer;
   multiple time stamping units, with a respective time stamping unit being associated with a corresponding demultiplexer, to time stamp the subset of data packets selected by the corresponding demultiplexer, the time stamp being used to reconstruct the subset of data packets;
   multiple queues, with a respective queue being associated with a corresponding demultiplexer, to store the subset of data packets selected by the corresponding demultiplexer;
   a multiplexer to aggregate the data packets held in the queues into a single data stream; and
   a remodulator to remodulate the single data stream for local transmission to an indoor integrated receiver/decoder over a single cable, the indoor integrated receiver/decoder is to transmit the single data stream to one or more receiving devices for display.

6. The transmodulating outdoor unit as recited in claim 5, wherein the demodulators are further to employ a first modulation technique, and
   wherein the remodulator is to employ a second modulation technique that is different from the first modulation technique.

7. The transmodulating outdoor unit as recited in claim 5, further comprising at least one processor to provide at least one of the program identifiers to the demultiplexers in response to viewer selection of a program.

8. The transmodulating outdoor unit as recited in claim 5, further comprising at least one processor to provide tuning control information to the tuners.

9. The transmodulating outdoor unit as recited in claim 5, further comprising at least one switch to connect multiple satellite receiver connectors with the multiple tuners.

10. A home satellite receiving system, comprising:
    a satellite receiver;
    an indoor decoding unit; and
    the transmodulating outdoor unit as recited in claim 5, coupled to the satellite receiver and to the indoor decoding unit, the outdoor unit being connected to the indoor decoding unit via a single cable over which the single data stream is transmitted locally.

11. A method, comprising:
    tuning, by a transmodulating outdoor unit, to multiple satellite signals from multiple satellites;
    demodulating, by the transmodulating outdoor unit, the signals into respective streams of data packets the respective streams of data packets containing a header that includes a program identifier that associates individual data packets with a particular multimedia program;
    aggregating, by the transmodulating outdoor unit, the data packets from the respective streams and selecting a subset of data packets from the data packets from the respective streams to be included in a single data stream, the subset of data packets included in the single data stream being associated with multimedia programs requested by a viewer and being selected based on the program identifier found in the header, wherein the subset of data packets included in the single data stream do not include data packets associated with multimedia programs not requested by the viewer; and
    remodulating, by the transmodulating outdoor unit, the single data stream for local transmission to an indoor integrated receiver/decoder over a single cable, the indoor integrated receiver/decoder to transmit the single data stream to one or more receiving devices for display.

12. The method as recited in claim 11, wherein the demodulating and the modulating utilize different modulation schemes.

13. The method as recited in claim 11, further comprising transmitting the single data stream over a single coaxial cable to the indoor receiving unit.

14. The method as recited in claim 11, further comprising handling different ones of the data packets at variable rates relative to one another.

15. The method as recited in claim 11, further comprising handling different ones of the data packets at variable delays relative to one another.

* * * * *